(12) United States Patent
Angaiah et al.

(10) Patent No.: US 6,682,712 B2
(45) Date of Patent: Jan. 27, 2004

(54) PROCESS FOR THE PREPARATION OF LITHIUM HEXAFLUOROARSENATE

(75) Inventors: Subramanian Angaiah, Karaikudi (IN); Vasudevan Thiagarajan, Karaikudi (IN); Gnagadharan Ramaiyer, Karaikudi (IN); Raghavan Meenakshisundaram, Karaikudi (IN)

(73) Assignee: Council of Scientific & Industrial Research, New Delhi (IN)

( * ) Notice: Subject to any disclaimer, the term of this patent is extended or adjusted under 35 U.S.C. 154(b) by 0 days.

(21) Appl. No.: 10/108,639

(22) Filed: Mar. 29, 2002

(65) Prior Publication Data

US 2003/0190279 A1 Oct. 9, 2003

(51) Int. Cl.$^7$ .............................. C01B 9/08; C01G 28/02
(52) U.S. Cl. ........................ 423/464; 423/463; 423/602
(58) Field of Search ................................ 423/464, 463, 423/602

(56) References Cited

U.S. PATENT DOCUMENTS

| | | | | | |
|---|---|---|---|---|---|
| 3,925,539 | A | * | 12/1975 | Meshri et al. | 423/464 |
| 4,053,571 | A | * | 10/1977 | Ebner et al. | 423/464 |
| 4,065,550 | A | * | 12/1977 | Ebner et al. | 423/464 |
| 4,107,404 | A | * | 8/1978 | Horning et al. | 429/340 |

FOREIGN PATENT DOCUMENTS

EP      0 816 288 A      1/1998

* cited by examiner

*Primary Examiner*—Ngoc-Yen Nguyen
(74) *Attorney, Agent, or Firm*—Sughrue Mion, PLLC

(57) ABSTRACT

The present invention provides a novel thermal solid state method for the synthesis of lithium hexfluoroarsenate either in a two step or a single step method, preferably at last substantially in the solid state.

17 Claims, 1 Drawing Sheet

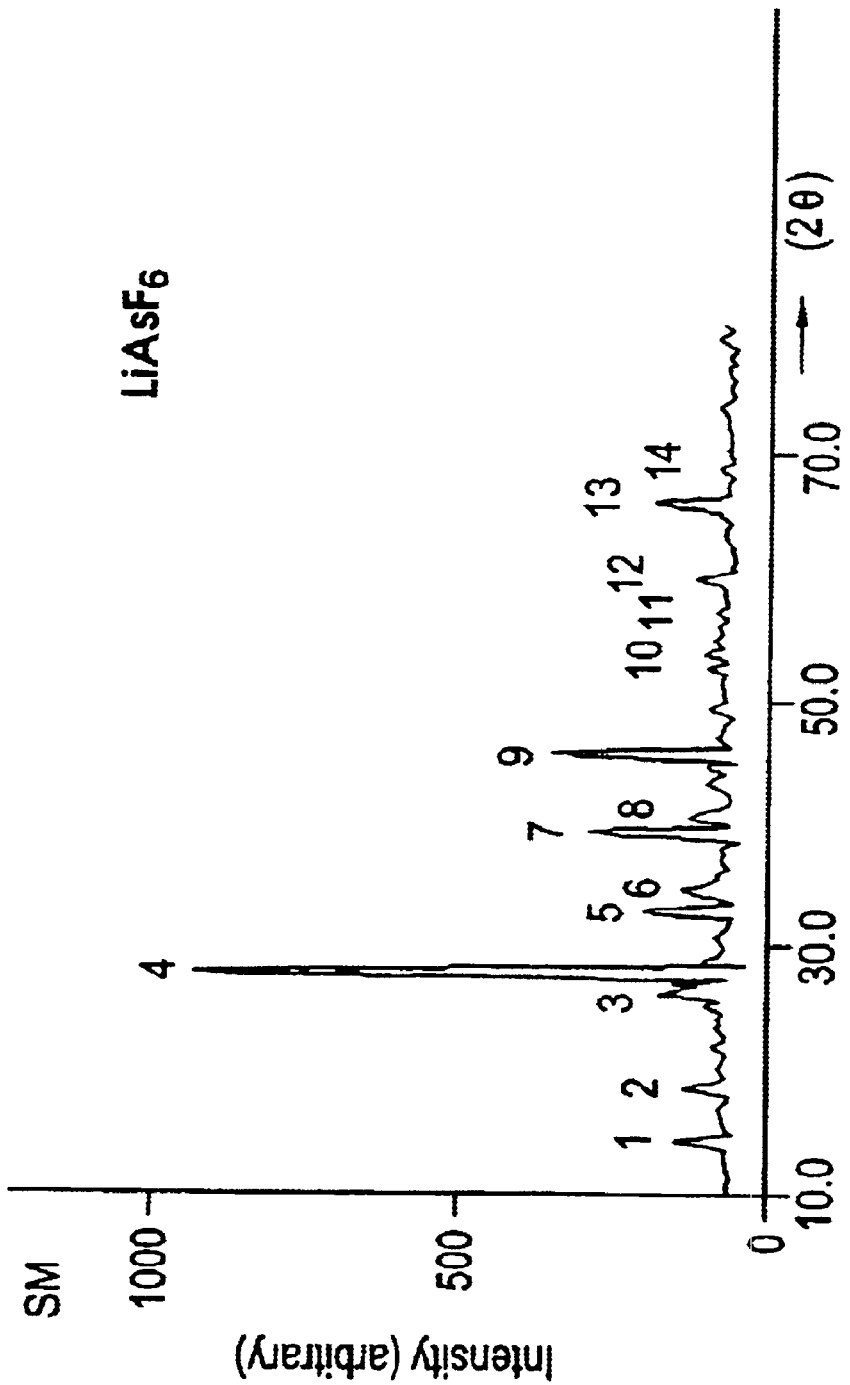

PROCESS FOR THE PREPARATION OF LITHIUM HEXAFLUOROARSENATE

FIELD OF THE INVENTION

The present invention relates to a novel process for the preparation of lithium hexafluoro arsenate ($LiAsF_6$) useful as an electrolyte in nonaqueous solid state and polymer electrolyte lithium based primary and secondary batteries.

BACKGROUND OF THE INVENTION

Lithium hexafluoro arsenate ($LiAsF_6$) is useful as an electrochemical energy producing electrolyte cell with small cation and large anion which never helps good conductivity in non conventional media like non-aqueous solvents, solid state ionic materials and polymer based electrolyte medium. The general method, available in literature deals with $AsF_5$, $F_2$ etc., which are difficult to handle. A few chemicals of the above type need sophisticated equipment to handle, operate and installation needs heavy investment. Apart from that environmentally such unfriendly chemicals need protection.

A literature survey revealed the following references:
1. Fluorine Chemistry Vol II J. H. Simons Ed. Academy Press New York, pg. 38, 1955.
2. Fluorine Chemistry Vol H. J. Emedius Ed. Academic Press New York page 76 (1955).
3. Fluorine Chemistry Vol II W. Large Ed. Academic Press New York page 12(1955).
4. P. L. Soni. Textbook of Inorganic Chemistry S. Chand & Co. Delhi page 425 (1985).

Lithium hexafluro arsenate ($LiAsF_6$) is prepared by all solid state thermal or partial solid state reactions where arsenous trioxide ($As_2O_3$) is allowed to react with lithium hydroxide or lithium oxide or lithium carbonate or lithium nitrate in equimolar proportions under controlled thermal conditions so as to get lithium arsenite ($LiAsO_2$) which was allowed to react with HF or $NH_4F$ so as to obtain $LiAsF_6$. Alternatively, arsenous trioxide ($As_2O_3$) is mixed with LiOH or $Li_2O$ or $Li_2CO_3$ and $NH_4F$ is required proportions and the mix is heated in an electric furnace in between temperatures 150–300° C. for 4 hours continuously. The resultant product was examined by X-ray for purity and identity.

Lithium hexafluoro arsenate ($LiAsF_6$) prepared by other methods suffer from the following disadvantages.
1. Toxic chemicals are required for preparation.
2. Difficult to handle toxic chemicals.
3. The product contains unreacted reactants as impurity
4. Partial reactions occur.
5. Needs several equipment to avoid pollution problems.
6. It is not based as solid state reactions.

OBJECTS OF THE INVENTION

The main object of this present invention is to provide a novel method for the preparation of lithium hexafluoro arsenate ($LiAsF_6$) which obviates the draw backs mentioned above.

Another object of this present invention is to provide a complete solid state single/double stage preparation or partial solid state method of preparation.

Still yet another object of this invention is to avoid costly equipments to handle obnoxious gases used for the preparation of lithium hexafluoro arsenate ($LiAsF_6$).

Yet still another object of this invention is to develop a single thermal procedure for the preparation of lithium hexafluoro arsenate ($LiAsF_6$) or an intermediate lithium hypoarsenite ($LiAsO_2$).

Another object of this present invention is to get the product without any side reaction or partial reaction.

SUMMARY OF THE INVENTION

Accordingly the present invention provides a process for the preparation of lithium hexafluoro arsenate comprising contacting arsenous trioxide with a lithium source and a fluorine source, all being in solid state and heating to obtain lithium hexafluoro arsenate.

In one embodiment of the invention, the lithium source is selected from the group consisting of LiOH, $Li_2O$, $LiNO_3$ and $Li_2CO_3$.

In another embodiment of the invention, the fluorine source is selected from HF and $NH_4F$.

In one embodiment of the invention, the process comprises two stages comprising mixing the lithium source with arsenous trioxide in equimolar proportions and heating the slowly in an electric furnace initially to 100° C. and then continuously for 4 hours at a temperature in the range of 200–300° C. to obtain lithium meta arsenate ($LiAsO_2$), reacting the lithium metaarsenite product with a fluorine source for about 4 hours to obtain lithium hexafluoro arsenate.

In a further embodiment of the invention, the fluorine source is selected from 10–30% HF and 6–9 times the molecular weight of $NH_4F$.

In another embodiment of the invention, lithium meta arsenate ($LiAsO_2$) is mixed with ammonium fluoride and heated in an electric furnace in between temperatures of 150–300° C. continuously for 4 hours to obtain $LiAsF_3$ confirmed by X-ray analysis.

In another embodiment of the invention, the reaction is carried out in a single step process comprising mixing a lithium source selected from the group consisting of LiOH, $Li_2O$, $Li_2CO_3$ and $LiNO_3$ with equimolar quantity of arsenous trioxide ($As_2O_3$) and seven times molecular weight ammonium fluoride, heating the solid mixture in an electric furnace at a temperature in the range of 150–300° C. for 4 hours to obtain the desired product.

In one embodiment of the invention, the method comprises a full solid state thermal reaction of lithium salt with arsenous trioxide ($As_2O_3$) and ammonium fluoride mixture in the ratio 1:1:6–9 heated in an electric furnace continuously for 4 hours at a temperature in the range of 150–300° C. to obtain lithium tetrafluoro arsenate confirmed by X-ray analysis.

In an embodiment of the invention LiOH or $Li_2O$ or $Li_2CO_3$ or $LiNO_3$ is mixed with arsenous trioxide in the ratio 1:1 or get $LiAsO_2$.

In another embodiment of the invention $LiAsO_2$ is mixed with $NH_4F$ in a ratio 1:6–9.

In yet another embodiment of this invention $LiAsO_2$ is mixed with 10–30% HF.

In yet another embodiment of this invention lithium salt, arseneous trioxide and $NH_4F$ are mixed in the ratio 1:1:6–9.

In still yet another embodiment of this invention an electric furnace is used to prepare $LiAsO_2$ intermediate or the final product $LiAsF_6$.

In another embodiment of this reaction all solid state or partial solid sate reaction is possible depending on the reactions envisaged for getting the end product $LiASF_2$.

BRIEF DESCRIPTION OF THE ACCOMPANYING DRAWING

FIG. 1 shows the X-ray analysis of the product lithium hexafluoro arsenate obtained by the process of the invention.

DETAILED DESCRIPTION OF THE INVENTION

The present invention provides a novel thermal solid state method for the synthesis of lithium hexafluoroarsenate either in a two step or a single step method. A lithium salt such as pure dry and AR LiOH or $Li_2O$ or $Li_2CO_3$ or $LiNO_3$ is mixed with equimolar proportion of arseneous trioxide and heated in an electric furnace carefully at temperatures between 250–400° C. for 4 hours continuously. The resultant intermediate product was mixed with six to nine times its molecular weight of ammonium fluoride (AR) and carefully heated in a muffle furnace continuously for 4 hours at a temperature in between 150–300° C. to obtain $LiAsF_6$. The following reactions occur when $As_2O_3$ reacts with $Li_2O$ or $Li_2CO_3$ or LiOH or $LiNO_3$.

Solid State Reaction
1. $2LiOH + As_2O_3 \rightarrow 2LiAsO_2 + H_2O$
2. $2LiNO_3 + As_2O_3 \rightarrow 2LiAsO_2 + 2NO_2 + O$
3. $Li_2CO_3 + As_2O_3 \rightarrow 2LiAsO_2 + CO_2$
4. $Li_2O + As_2O_3 \rightarrow LiAsO_2$ $LiAsF_6$ can be obtained by reacting the intermediate product with 10 times its molecular weight of $NH_4F$. In another alternative route, the intermediate product lithium hypo arsenite reacts with either 10–30% HF or 7 to 9 times the quantity of $N H_4F$ to get $LiAsF_6$ product.

$LiAsO_2 + 6HF \rightarrow LiAsF_6 = 2H_2O + H_2$

A mixture of $LiAsO_2$ and $NH_4F$ of equimolar proportion 1:(6–9) react thermally to form $LiAsF_6$.

$LiAsO_2 + 6NH_4F \rightarrow LiAsF_6 + 2NH_3 + H_2O + H_2$

Also a mixture of $As_2O_3$ and lithium salt and ammonium fluoride reacts as follows $Li_2O + As_2O_3 + 12NH_4F \rightarrow 2LiAsF_6 + 12NH_3 + 4H_2O + 2H_2$ The resultant product lithium tetrafluoro arsenate was confirmed by X-ray analysis. The reactions are preferably carried out in an electric furnace. The reaction can be either one step or two step depending on the reactions envisaged for getting the final product $LiAsF_6$. Pure dry AR LiOH or $Li_2O$ or $Li_2CO_3$ or $LiNO_3$ is mixed with equimolar proportions of arseneous trioxide and heated the mixture in a electric furnace carefully in between the temperatures 250–400° C. for 4 hours continuously. The resultant intermediate product was mixed with six to nine times the molecular of ammonium fluoride (AR) and the mix was carefully heated in a muffle furnace continuously for 4 hours in between temperatures 150–300° C. and the resultant product $LiAsF_6$.

The following examples are given by way of illustration and therefore should not be construed to limit the scope of the present invention.

EXAMPLE 1

An equimolar mixture of $Li_2O$ (AR) and $As_2O_3$ (AR) are ground well and then heated to 200° C. in an electric furnace for 4 hours continuously. The product was ground well and was mixed with 7 times the weight of $NH_4F$ (AR). Then this mix was again heated in an electric furnace for 4 hours continuously at a temperature of 200° C. to get $LiAsF_6$.

| Components | Composition |
| --- | --- |
| $Li_2O$ | 0.30 g |
| $As_2O_3$ | 1.98 g |
| $NH_4F$ | 2.59 g |
| Time | 4 hours |
| Temperature | 200° C. |
| Nature of Product | Transparent |
| Efficiency of the process >90% | |

EXAMPLE 2

An equimolar mixture of LiOH (AR) and $As_2O_3$ (AR) are ground well and the mix heated to 200° C. in an electric furnace for 4 hours continuously. The product was ground well and was mixed with 7 times the weight of $NH_4F$ (AR). The mix was then again heated in an electric furnace for 4 hours continuously at a temperature of 200° C. to get $LiAsF_6$.

| Components | Composition |
| --- | --- |
| LiOH | 0.24 g |
| $As_2O_3$ | 1.98 g |
| $NH_4F$ | 2.59 g |
| Time | 4 hours |
| Temperature | 200° C. |
| Nature of the product | Transparent |
| Efficiency of the process >91% | |

EXAMPLE 3

An equimolar mixture of $Li_2CO_3$ (AR) and $As_2O_3$ (AR) are ground well and the mix heated to 200° C. in an electric furnace for 4 hours continuously. The product was ground well and was mixed with 7 times the weight $NH_4F$ (AR). The mix was then again heated in an electric furnace for 4 hours continuously at a temperature of 200° C. to get $LiAsF_6$.

| Components | Composition |
| --- | --- |
| $Li_2CO_3$ | 0.74 g |
| $As_2O_3$ | 1.98 g |
| $NH_4F$ | 2.59 g |
| Time | 4 Hours |
| Temperature | 200° C. |
| Nature of the product | Transparent |
| Efficiency of the process >90% | |

EXAMPLE 4

An equimolar mixture of $LiNO_3$ (AR) and $As_2O_3$ (AR) are ground well and the mix heated to 200° C. in an electric furnace for 4 hours continuously. The product was ground well and was mixed with 7 times the weight of $NH_4F$ (AR) and then this mix was again heated in an electric furnace for 4 hours continuously at a temperature of 200° C. to get $LiAsF_6$.

| Components | Composition |
|---|---|
| $LiNO_3$ | 0.69 g |
| $As_2O_3$ | 1.98 g |
| $NH_4F$ | 2.59 g |
| Time | 4 hours |
| Temperature | 200° C. |
| Nature of product | Transparent |
| Efficiency of the process >91% | |

EXAMPLE 5

AR quality of $Li_2O$ with AR arseneous trioxide and AR $NH_4F$ of ratios 1:1:(6–9) are ground well to get uniform mix which was heated to 200° C. to get the product $LiAsF_6$.

| Components | Composition |
|---|---|
| $Li_2O$ | 0.30 g |
| $As_2O_3$ | 1.98 g |
| $NH_4F$ | 2.59 g |
| Time | 4 hours |
| Temperature | 200° C. |
| Nature of the product | Transparent |
| Efficiency of the process >90% | |

EXAMPLE 6

AR quality of $Li_2CO_3$ with AR arseneous trioxide and AR $NH_4F$ of ratios 1:1:(6–9) are ground well to get uniform mix which was heated to 200° C. to get the product $LiAsF_6$.

| Components | Composition |
|---|---|
| $Li_2CO_3$ | 0.74 g |
| $As_2O_3$ | 1.98 g |
| $NH_4F$ | 2.59 g |
| Time | 4 hours |
| Temperature | 200° C. |
| Nature of the product | Transparent |
| Efficiency of the process >90% | |

EXAMPLE 7

AR quality of LiOH with AR arseneous trioxide and AR $NH_4F$ of ratios 1:1:(6–9) are ground well to get uniform mix which was heated to 200° C. to get the product $LiAsF_6$.

| Components | Composition |
|---|---|
| LiOH | 0.24 g |
| $As_2O_3$ | 1.98 g |
| $NH_4F$ | 2.59 g |
| Time | 4 hours |
| Temperature | 200° C. |
| Nature of the product | Transparent |
| Efficiency of the process >90% | |

EXAMPLE 8

AR quality of $LiNO_3$ with AR arseneous trioxide and AR $NH_4F$ of ratios 1:1:(6–9) are ground well to get uniform mix which was heated to 200° C. to get the product $LiAsF_6$.

| Components | Composition |
|---|---|
| $LiNO_3$ | 0.69 g |
| $As_2O_3$ | 1.98 g |
| $NH_4F$ | 2.59 g |
| Time | 4 hours |
| Temperature | 200° C. |
| Nature of the product | Transparent |
| Efficiency of the process >90% | |

CONCLUSION

1. Lithium salts like $Li_2O$, $Li_2CO_3$, LiOH, $LiNO_3$ or the mixtures react with arseneous trioxide in the ratio 1:1 to get the intermediate compound $LiAsO_2$.
2. $LiAsO_2$ reacts with AR $NH_4F$ to get $LiAsF_6$.
3. $LiAsO_2$ reacts with AR HF (10–30%) to get $LiAsF_6$.
4. AR lithium salts, $As_2O_3$ and $NH_4F$ (AR) in the ratio 1:1:(6–9) react to give $LiAsF_6$.
5. The temperature range is between 10° C. to 600° C. depending on the reaction processes.
6. The time of heating is in the range of 2–4 hours.

The main advantages of the present invention are:

1. A single step solid thermal method or a two step semi solid state reaction are possible depending on conditions of reactions.
2. Obnoxious gases and liquids like $AsF_3$, $AsF_5$, $F_2$ are avoided, thereby avoiding pollution problems.
3. Costly equipment to handle these gaseous materials are avoided.
4. A simple solid state/semi solid state thermal process is developed to prepare $LiAsF_6$.

We claim:

1. A process for the preparation of lithium hexafluoro arsenate comprising contacting arsenous trioxide with a lithium source and ammonium fluoride, all being in solid state and heating to obtain lithium hexafluoro arsenate.

2. A process as claimed in claim 1 wherein the lithium source is selected from the group consisting of LiOH, $Li_2O$, $LiNO_3$ and $Li_2CO_3$.

3. A process as claimed in claim 1 wherein the lithium source, the arsenous trioxide and the ammonium fluoride are used in a ratio of 1:1:6–9.

4. A process as claimed in claim 1 wherein the process is carried out in a single thermal step comprising mixing the lithium source selected from the group consisting of LiOH, $Li_2O$, $Li_2CO_3$ and $LiNO_3$ with arsenous trioxide ($As_2O_3$) and ammonium fluoride in a ratio of 1:1:6–9, and heating the resulting solid mixture in an electric furnace at a temperature in the range of 150–300° C. for 4 hours to obtain lithium hexafluoroarsenate.

5. A process as claimed in claim 1 wherein the lithium source and arsenous trioxide ($As_2O_3$) and ammonium fluoride are mixed in a ratio 1:1:6–9, heated in an electric furnace continuously for 4 hours at a temperature in the range of 150–300° C. to obtain lithium hexafluoro arsenate confirmed by X-ray analysis.

6. A process as claimed in claim 1 wherein the process comprises stages comprising first mixing the lithium source with arsenous trioxide in equimolar proportions and heating slowly in an electric furnace initially to 100° C. and then continuously for 4 hours at a temperature in the range of 200–300° C. to obtain lithium metaarsenate ($LiAsO_2$), and secondly reacting the lithium metaarsenate product with ammonium fluoride for about 4 hours to obtain lithium hexafluoro arsenate.

7. A process as claimed in claim 6 wherein the ratio of the lithium metaarsenate to the ammonium fluoride is 1:6–9.

8. A process as claimed in claim 6 wherein the lithium source is selected from the group consisting of LiOH or $Li_2O$ or $Li_2CO_3$ or $LiNO_3$ and is mixed with arsenous trioxide in a molar ratio of 1:1 to obtain an intermediate product $LiAsO_2$.

9. A process as claimed in claim 8 wherein the ratio of the intermediate $LiAsO_2$ obtained to the ammonium fluoride is 1:6–9.

10. A process as claimed in claim 8 wherein an electric furnace is used to prepare the $LiAsO_2$ intermediate.

11. A process as claimed in claim 1 wherein the temperature is from 150° to 300° C.

12. A process as claimed in claim 8 wherein the intermediate $LiAsO_2$ is prepared at a temperature in the range of 200–600° C.

13. A process for the preparation of lithium hexafluoroarsenate comprising mixing a lithium source with arsenous trioxide ($As_2O_3$) and ammonium fluoride in a ratio of 1:1:6–9, heating the resulting solid mixture in an electric furnace at a temperature in the range of 150–300° C. for 4 hours to obtain the lithium hexafluoroarsenate product.

14. A process as claimed in claim 13 wherein the lithium source is selected from the group consisting of LiOH, $Li_2O$, $LiNO_3$ and $Li_2CO_3$.

15. A process for the preparation of lithium hexafluoroarsenate comprising first mixing a lithium source with arsenous trioxide in equimolar proportions and heating slowly in an electric furnace initially to 100° C. and then continuously for 4 hours at a temperature in the range of 200–300° C. to obtain lithium meta arsenate ($LiAsO_2$), and secondly reacting the lithium metaarsenate product with ammonium fluoride for about 4 hours to obtain lithium hexafluoro arsenate.

16. A process as claimed in claim 15 wherein the ratio of the lithium metaarsenate to the ammonium fluoride is 1:6–9.

17. A process as claimed in claim 15 wherein the lithium source is selected from the group consisting of LiOH, $Li_2O$, $LiNO_3$ and $Li_2CO_3$.

* * * * *